United States Patent
Cha et al.

(10) Patent No.: US 10,291,039 B2
(45) Date of Patent: May 14, 2019

(54) METHOD AND APPARATUS FOR CONTROLLING SUPPLY OF POWER TO ELECTRONIC DEVICE

(71) Applicant: Samsung Electronics Co., Ltd., Gyeonggi-do (KR)

(72) Inventors: Dohun Cha, Gyeonggi-do (KR); Jungsik Park, Gyeonggi-do (KR); Seonil Kim, Gyeonggi-do (KR); Hyunju Hong, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 124 days.

(21) Appl. No.: 15/082,448

(22) Filed: Mar. 28, 2016

(65) Prior Publication Data
US 2016/0285287 A1 Sep. 29, 2016

(30) Foreign Application Priority Data

Mar. 27, 2015 (KR) .................. 10-2015-0042957

(51) Int. Cl.
*H02J 7/00* (2006.01)
*H01M 10/44* (2006.01)

(52) U.S. Cl.
CPC .......... *H02J 7/0021* (2013.01); *H02J 7/0018* (2013.01); *H01M 10/44* (2013.01); *H02J 7/007* (2013.01); *H02J 7/0014* (2013.01); *H02J 7/0068* (2013.01); *H02J 2007/0067* (2013.01)

(58) Field of Classification Search
CPC .. H02J 2007/0067; H02J 7/0014; H02J 7/007; H02J 7/045; H02J 7/0018; H02J 7/0021; H02J 7/0068; H01M 10/44
See application file for complete search history.

(56) References Cited

U.S. PATENT DOCUMENTS

| | | | | |
|---|---|---|---|---|
| 5,666,006 A * | 9/1997 | Townsley | ............ | H02J 7/0024 307/43 |
| 6,008,629 A * | 12/1999 | Saeki | ............ | H01M 10/425 320/140 |
| 6,194,871 B1 * | 2/2001 | Haraguchi | ............ | H02J 7/0031 320/134 |
| 6,741,065 B1 * | 5/2004 | Ishii | ............ | B60L 11/1816 320/122 |
| 7,162,331 B2 * | 1/2007 | Sakai | ............ | H02J 7/0068 318/568.1 |

(Continued)

FOREIGN PATENT DOCUMENTS

| KR | 100969589 | 7/2010 |
|---|---|---|
| KR | 101332320 | 11/2013 |

*Primary Examiner* — Helen Rossoshek
(74) *Attorney, Agent, or Firm* — The Farrell Law Firm, P.C.

(57) ABSTRACT

Disclosed are method and apparatus for controlling the supply of power in an electronic device are provided. The apparatus includes two or more batteries, a mutual charging prevention controller, a sequential discharging controller, and a controller that detects remaining capacities of the two or more batteries, charges a main battery of the two or more batteries in a single charging mode, when the remaining battery capacity of the main battery is less than or equal to a preset remaining battery capacity set to select a charging mode, and simultaneously charges the two or more batteries, when the remaining battery capacity of the main battery is greater than the preset remaining battery capacity.

18 Claims, 16 Drawing Sheets

(56) References Cited

U.S. PATENT DOCUMENTS

| | | | | |
|---|---|---|---|---|
| 7,737,660 | B2* | 6/2010 | Yun | H02J 7/0004 |
| | | | | 320/132 |
| 9,479,083 | B2* | 10/2016 | Makita | H02M 7/5387 |
| 9,680,303 | B2* | 6/2017 | Takahashi | H02J 3/383 |
| 2002/0147037 | A1* | 10/2002 | Kwon | G06F 1/263 |
| | | | | 455/574 |
| 2003/0160593 | A1* | 8/2003 | Yau | H02J 7/0018 |
| | | | | 320/116 |
| 2006/0290399 | A1* | 12/2006 | MacDougall | H03K 3/53 |
| | | | | 327/181 |
| 2013/0127687 | A1* | 5/2013 | Yu | H01M 10/44 |
| | | | | 345/1.1 |
| 2014/0015488 | A1* | 1/2014 | Despesse | H01M 10/425 |
| | | | | 320/122 |
| 2014/0029323 | A1 | 1/2014 | Makita et al. | |
| 2014/0055097 | A1* | 2/2014 | Nagai | H02J 7/007 |
| | | | | 320/134 |
| 2014/0111166 | A1* | 4/2014 | Yun | B60L 11/1866 |
| | | | | 320/162 |
| 2014/0117756 | A1* | 5/2014 | Takahashi | H02J 3/383 |
| | | | | 307/23 |
| 2016/0006278 | A1* | 1/2016 | Sakakibara | H02J 7/0019 |
| | | | | 320/112 |
| 2016/0049813 | A1* | 2/2016 | Takizawa | H01M 10/441 |
| | | | | 320/112 |
| 2016/0112775 | A1* | 4/2016 | Kim | A61B 5/0002 |
| | | | | 340/870.07 |
| 2017/0057650 | A1* | 3/2017 | Walter-Robinson | |
| | | | | B64D 41/00 |

* cited by examiner

<610>

<620>

<630>

<640>

METHOD AND APPARATUS FOR CONTROLLING SUPPLY OF POWER TO ELECTRONIC DEVICE

PRIORITY

This application claims priority under 35 U.S.C. § 119(a) to a Korean Patent Application filed on Mar. 27, 2015 in the Korean Intellectual Property Office and assigned Serial no. 10-2015-0042957, the contents of which are incorporated herein by reference.

BACKGROUND

1. Field of the Disclosure

The present disclosure relates to a method and apparatus for controlling the supply of power to an electronic device, via a battery and a plurality of power converters.

2. Description of the Related Art

Electronic device users want to use their electronic devices as long as possible on a single battery charge, which has led to extensive electronic device battery research.

As an example, a power system has been developed to generate electric power within the electronic devices, for extended range operation using the self-generated electric power. More specifically, electronic devices have been equipped with a power converter that converts thermal energy into electric power, which is supplied to the battery of the electronic devices. As another example, a backup battery is used to extend the operation time of electronic devices using electric power from the backup battery, which supplements the electric power from the battery.

Conventional electronic devices enable the power converter to generate electric power when they detect that the voltage level of the built-in power converter is greater than a preset threshold. Although the battery of electronic devices has remaining power, when the electronic devices detect that the voltage level of the built-in power converter is less than or equal to a preset threshold, the electronic devices stop the supply of power to the system, thereby wasting the remaining power.

Conventional electronic devices that are equipped with a plurality of batteries can be implemented to simultaneously charge the batteries. In this instance, however, a phenomenon in which the batteries charge and discharge each other tends to occur. In addition, the conventional batteries tend to concurrently discharge, since they are maintained at the same voltage level.

As such, there is a need in the art for an improved method and apparatus for controlling the supply of power to an electronic device.

SUMMARY

The present disclosure has been made to address the above problems and disadvantages, and to provide at least the advantages described below. Accordingly, an aspect of the present disclosure is to provide a method and apparatus for controlling the connection of several power converters, in series or in parallel, according to the voltage level of the power converters, thereby supplying electric power to the electronic device.

Another aspect of the present disclosure is to provide a method and apparatus for storing power, collected via the series or parallel connection of several power converters, in several batteries, and controlling the batteries to discharge in order or to be charged simultaneously, without mutually charging and discharging the batteries.

In accordance with an aspect of the present disclosure, an apparatus for controlling a supply of power in an electronic device includes two or more batteries, a mutual charging prevention controller that prevents reverse current when the two or more batteries are simultaneously charged and controls charging of the two or more batteries via a component other than the two or more batteries, a sequential discharging controller that prevents the two or more batteries from simultaneously discharging when the two or more batteries are discharged, and a controller that detects remaining capacities of the two or more batteries, charges a main battery of the two or more batteries in a single charging mode, when the remaining battery capacity of the main battery is less than or equal to a preset remaining battery capacity set to select a charging mode, and simultaneously charges the two or more batteries, when the remaining battery capacity of the main battery is greater than the preset remaining battery capacity.

In accordance with another aspect of the present disclosure, a method of controlling the supply of power in an electronic device includes checking remaining capacities of two or more batteries, comparing the checked remaining capacities of two or more batteries with a preset remaining battery capacity to select a charging mode, charging a main battery of the two or more batteries in a single charging mode, when the remaining capacity of the main battery is less than or equal to the preset remaining battery capacity, and simultaneously charging the two or more batteries, when the remaining capacity of the main battery is greater than the preset remaining battery capacity, wherein simultaneously charging the two or more batteries includes charging the two or more batteries via a component other than the two or more batteries.

BRIEF DESCRIPTION OF THE DRAWINGS

The above and other aspects, features and advantages of the present disclosure will be more apparent from the following detailed description, taken in conjunction with the accompanying drawings, in which.

DETAILED DESCRIPTION OF EMBODIMENTS OF THE DISCLOSURE

Hereinafter, embodiments of the present disclosure are described in detail with reference to the accompanying drawings. The same reference numbers are used throughout the drawings to refer to the same or similar parts. Detailed descriptions of well-known functions and structures incorporated herein may be omitted to avoid obscuring the subject matter of the disclosure.

Electronic devices according to the present disclosure are capable of including a series-parallel control circuit and a charging circuit. The series-parallel control circuit controls the connection of several power converters in series or in parallel, and controls several power converters to be connected in series or in parallel according to the voltage level of the power converters.

When the voltage level of several power converters is less than or equal to a preset threshold, the series-parallel control circuit controls the power converters to be connected in series, during which the voltage level of the power source for the electronic device can be increased over the preset threshold. The preset threshold refers to a voltage level serving as a point of reference to determine whether the electronic device performs a charging process using the power converter(s). The electronic device connects several power converters in series to increase the voltage level over the preset threshold, thereby collecting power from the power converters. Furthermore, the electronic device charges the battery using the electric power collected via the series connection of the power converters.

In another embodiment, when the voltage level of several power converters is greater than a preset threshold, the series-parallel control circuit connects the power converters in parallel to collect electric power and to maintain the voltage level equal to or less than the preset threshold.

The charging circuit receives the collected electric power from the series-parallel control circuit and charges several batteries with the received electric power. The electronic device is capable of simultaneously charging several batteries, preventing the batteries from charging and discharging each other. That is, the electronic device enables a mutual charging prevention controller to prevent several batteries from mutually charging and discharging. The mutual charging prevention controller includes a circuit configured to prevent reverse current.

The charging circuit includes a switch configured to prevent simultaneous discharging. The charging circuit enables the simultaneous discharging prevention switch to prevent several batteries from simultaneously discharging. That is, the electronic device controls several batteries to discharge (output) the power sequentially.

Figure 1:
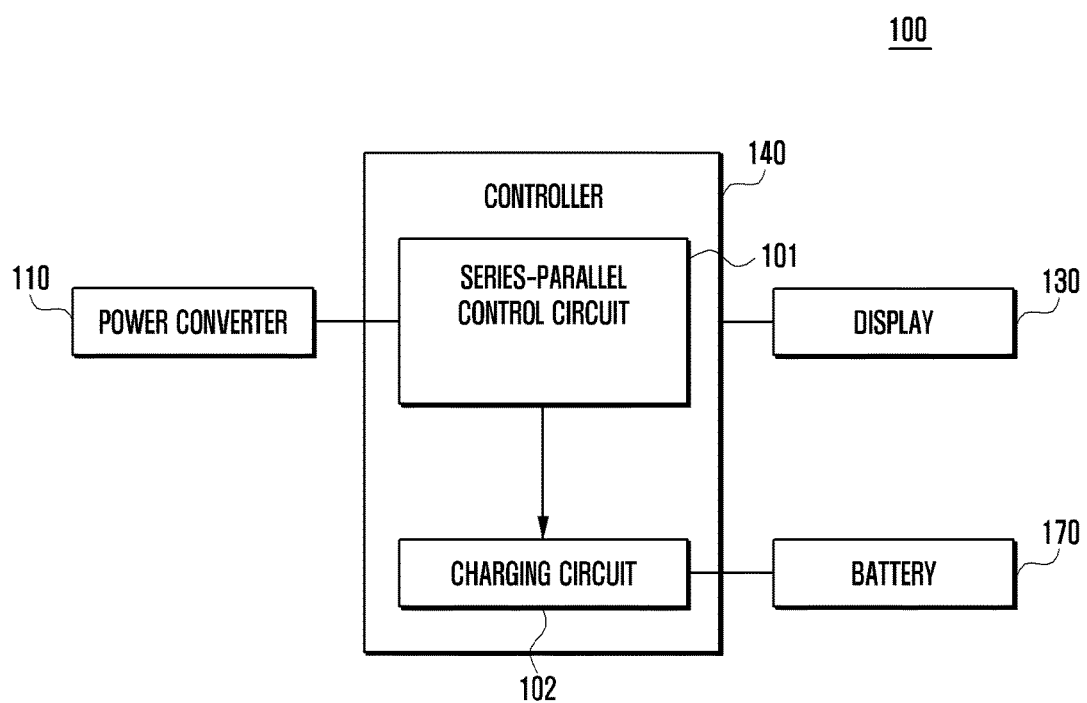
FIG. 1 is a schematic block diagram of an electronic device, according to embodiments of the present disclosure.

FIG. 1 is a schematic block diagram of an electronic device according to embodiments of the present disclosure.

Referring to FIG. 1, the electronic device 100 includes a power converter 110, a display 130, a controller 140 and a battery 170.

The power converter 110 may be configured to include several power converters, such as first and second power converters. The power converter 110 generates electric power in the electronic device 100. For example, the power converter 110 is capable of converting thermal energy or solar energy into electric power. The power converter 110 includes an integrated chip (IC), connected to the electronic device 100, and a device for performing electric power conversion. The power converter 110 supplies electric power, converted from other types of energy, to the controller 140 via the IC. The controller 140 stores the received power in the battery 170.

The display 130 displays running screens of the electronic device 100.

The display 130 displays an image informing a user of connection locations when the electronic device 100 can be connected to another electronic device.

The controller 140 controls the series-parallel control circuit 101 and the charging circuit 102.

The controller 140 controls the series-parallel control circuit 101 to collect power via the power converter 110, and to connect several power converters 110 in series or in parallel according to the voltage level of the power converters 110. That is, the controller 140 controls the series-parallel control circuit 101 to collect electric power.

The controller 140 supplies the electric power, collected via the series-parallel control circuit 101, to the charging circuit 102. The controller 140 enables the charging circuit 102 to charge the battery 170 in a single or multiple charging mode. The single charging mode supports a function for charging one battery more quickly than charging several batteries. The multiple charging mode supports a function for simultaneously charging several batteries. More specifically, the controller 140 sets the charging mode to single mode or multiple mode, according a battery capacity, the remaining battery capacity, and the power usage of an electronic device.

When the controller 140 checks a battery capacity and the remaining battery capacity, it may recognize a battery of a relatively small capacity as a main battery. When the controller 140 ascertains that the voltage levels of two or more batteries are less than or equal to a preset remaining battery capacity, the controller 140 charges the main battery in single charging mode. When the main battery has been charged to a fully-charged state, the controller 140 charges a sub-battery in single charging mode. When the voltage levels of all the batteries are greater than or equal to a preset remaining battery capacity, the controller 140 charges the batteries in a multiple charging mode.

The controller 140 checks the power usage of the electronic device, and sets the charge mode for two or more batteries based on the power usage.

The controller 140 charges the battery 170 using the charging circuit 102 as described above.

The battery 170 receives and stores electric power under the control of the controller 140. The battery 170 is configured to include several batteries, such as first and second batteries. The battery 170 may be charged in single charging mode or multiple charging mode, selected according a battery capacity, the remaining battery capacity, or the power usage of an electronic device, for example It should be understood that the charging mode of the battery 170 is not limited to the factors listed above, but may be set based on other factors.

The electronic device 100 may further include a connector with which to the electronic device 100 connects to other electronic devices and uses a power converter and a battery of the other electronic device via the connector. For example, the electronic device 100 charges the battery 170, using the power converter and the battery of the other electronic device, via the connector. As another example, the electronic device 100 supplies power, converted from the power converter 110, to a battery of another electronic device, via the connector.

Figure 2:
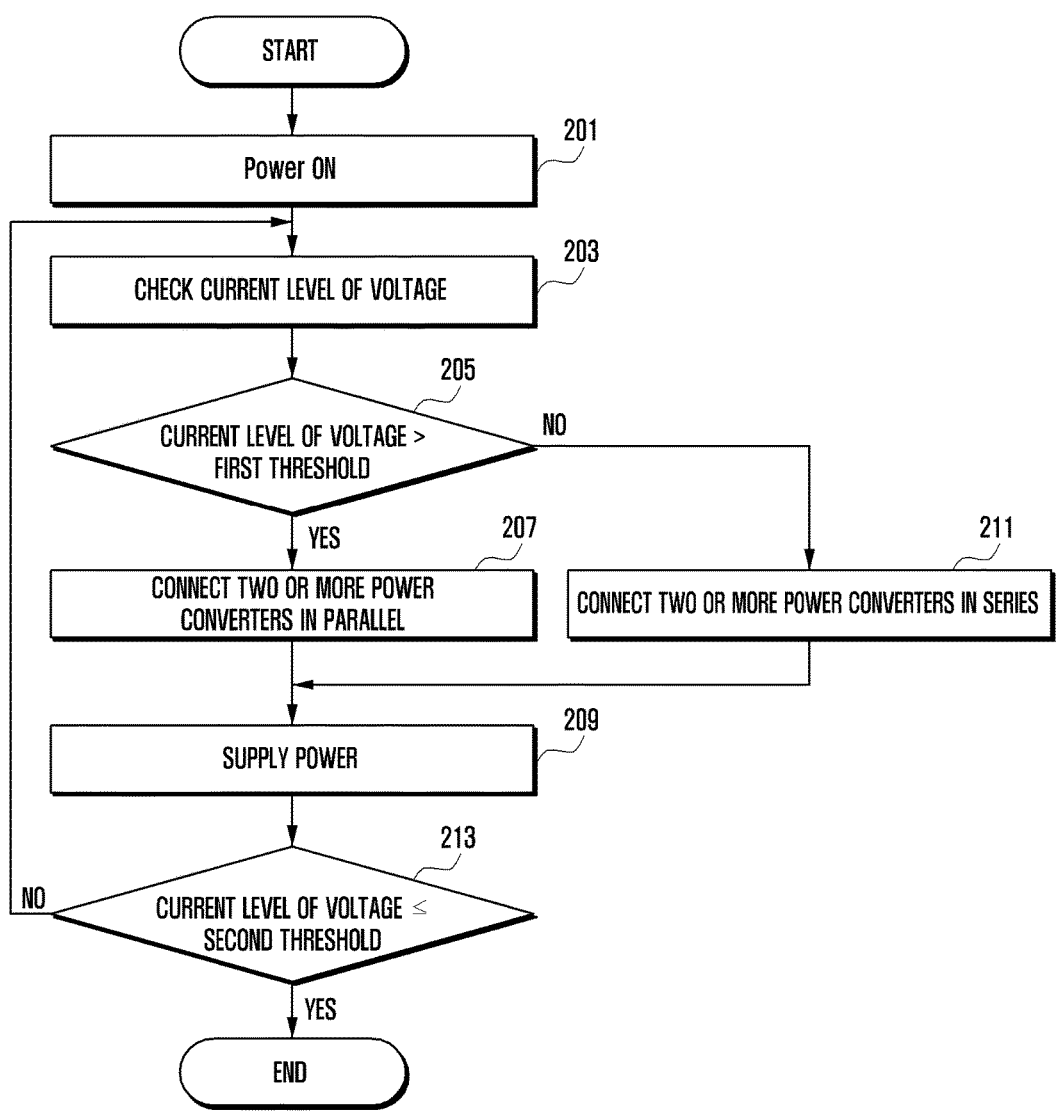
FIG. 2 illustrates a method of connecting, in series or parallel, power converters for collecting power of an electronic device, according to embodiments of the present disclosure.

FIG. 2 illustrates a method of connecting, in series or parallel, power converters for collecting power of an electronic device according to embodiments of the present disclosure.

The controller 140 determines that the electronic device 100 is turned on in step 201. When the controller 140 ascertains that the electronic device 100 is turned on, the controller 140 detects the current voltage level supplied to the electronic device 100 in step 203. The controller 140 determines whether the current voltage level is greater than a first threshold in step 205. The first threshold refers to a preset voltage level, such as 5.5V, used to enable the electronic device to perform a charging process. In this case, the controller 140 determines whether the current voltage level is greater than 5.5 V.

When the controller 140 ascertains that the current voltage level is greater than a first threshold in step 205 in step 205, the controller 140 connects several power converters 110 in parallel in step 207. In this parallel connection, although the current voltage level is greater than the first threshold, the controller 140 controls the power converters to maintain the current voltage level less than or equal to a particular voltage. The controller 140 increases an amount of current in the parallel connection of several power converters 110 at a lower speed or in a smaller increment unit than in the series connection of several power converters 110.

When the controller 140 ascertains that the current voltage level is less than or equal to a first threshold in step 205, the controller 140 connects two or more power converters 110 in series in step 211, during which the current voltage level exceeds the first threshold.

The controller 140 collects electric power as it controls the connection of two or more power converters 110 in series or in parallel, based on the comparison of the current voltage level and the first threshold. The controller 140 supplies the collected power to the charging circuit 102 in step 209, and stores power, output from the charging circuit 102, in the battery 170. The power stored in the battery 170 may be used to operate the system of the electronic device 100.

The controller 140 determines whether the current voltage level is less than or equal to a second threshold in step 213. The second threshold refers to a preset value, such as 4.5V, used to operate the series-parallel control circuit that is capable of collecting electric power based on the above-described processes.

When the controller 140 ascertains that the current voltage level is greater than the second threshold in step 213, the controller 140 returns to step 203. When the controller 140 ascertains that the current voltage level is less than or equal to the second threshold in step 213, the controller 140 enables the series-parallel control circuit to stop the system from collecting electric power.

Figure 3A:
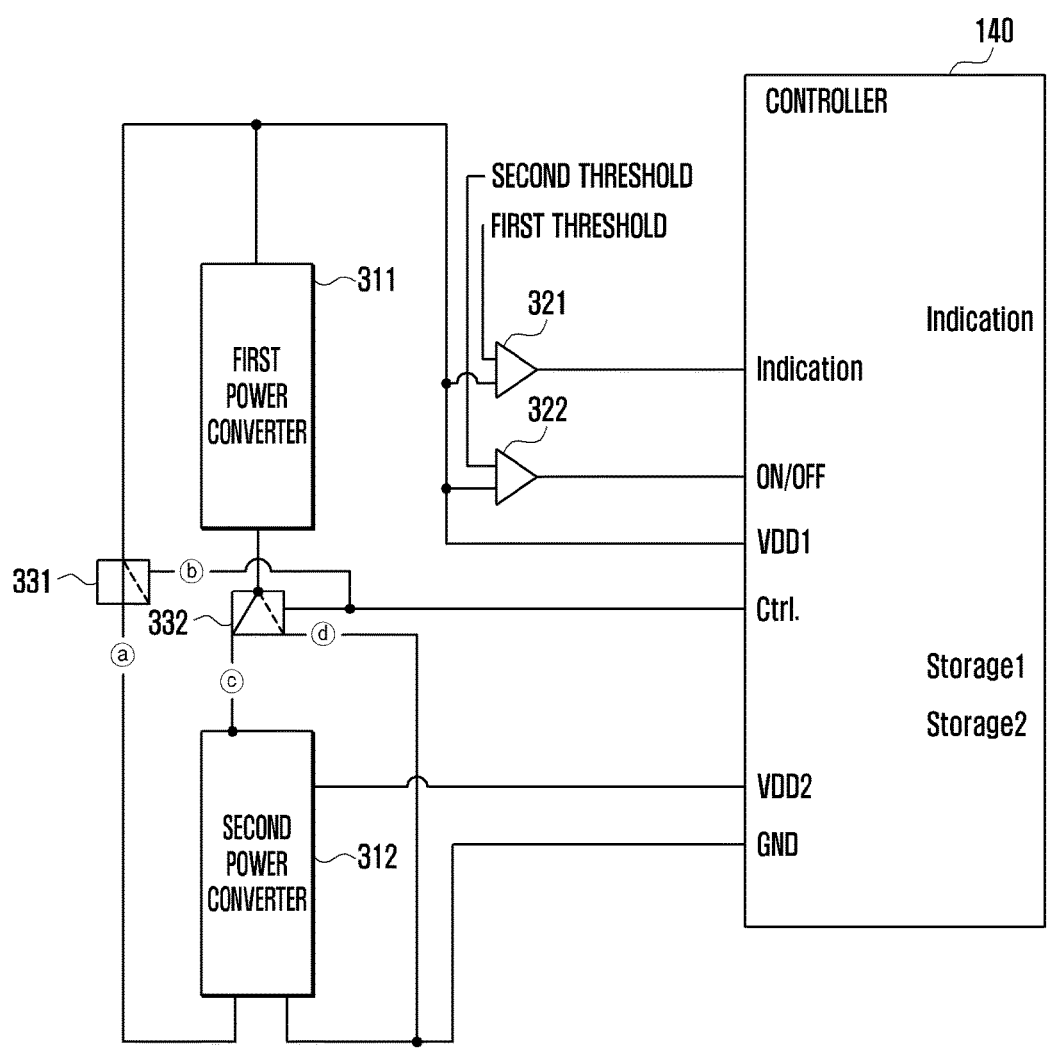
FIGS. 3A and 3B illustrate, circuits for controlling power converters to be connected in series or in parallel, according to embodiments of the present disclosure.
Figure 3B:
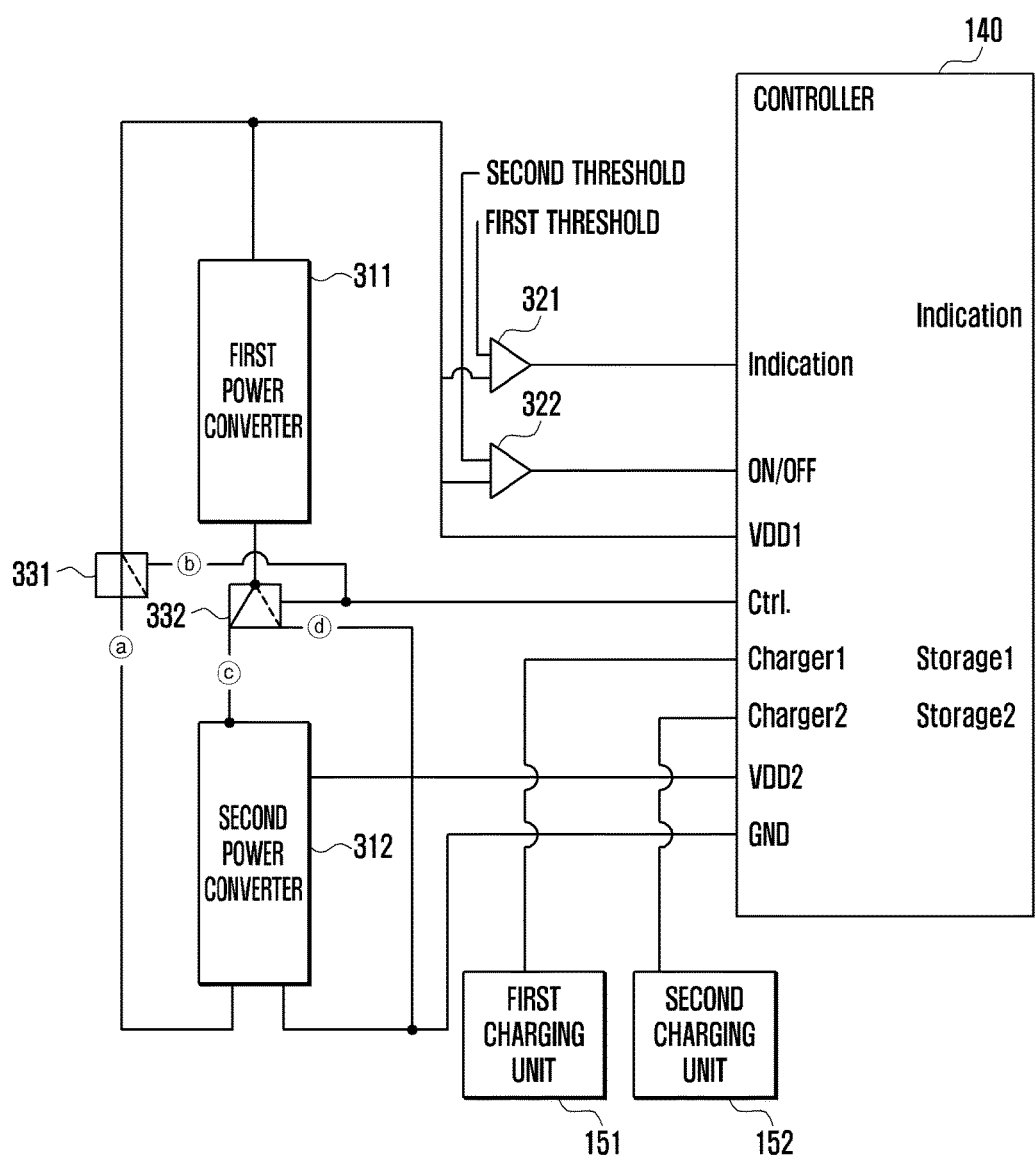

FIGS. 3A and 3B illustrate circuits for controlling power converters for collecting power of an electronic device to be connected in series or parallel according to embodiments of the present disclosure.

Referring to FIG. 3A, the series-parallel control circuit connected to the controller 140 includes two power converters 311 and 312, two comparators 321 and 322, and two switches 331 and 332.

According to an embodiment, the configuration of the series-parallel control circuit may be a coupled form, as several electronic devices are connected.

According to another embodiment, the configuration of the series-parallel control circuit may be included in one electronic device which may also include at least two configurations of the series-parallel control circuit as described above.

The power converters 311 and 312 may be implemented with a device for generating energy, such as a solar generator, a thermoelectric generator (TEG), or a chip combined with devices that convert one type of energy to another. For example, the power converters 311 and 312 may be implemented with a chip combined by a solar generator and a TEG, i.e., a solar thermo electric generator. The solar generator converts solar energy into electric power. The TEG converts thermal energy into electric power.

The power converters 311 and 312 may be physically separated from each other, or physically attached to each other but electrically insulated. The form of electrical insulation may be configured such that elements are layered in insulation or are separated apart from each other on the same plane.

The comparators 321 and 322 compare the voltage levels of the power converters 311 and 312 with a reference voltage level.

The first comparator 321 compares the voltage levels of the power converters 311 and 312 with a first threshold. The first threshold may be a value of voltage set to supply power to the battery 170 of the electronic device. The first comparator 321 is capable of comparing the voltage levels of the power converters 311 and 312 with the first threshold, such as 5.5 V.

When the voltage levels of the power converters 311 and 312 are each greater than the first threshold, such as 5.5 V, the first comparator 321 outputs, to the controller 140, a value, such as logic high or '1' set to connect the power converters 311 and 312 in parallel.

In another embodiment, when the voltage levels of the power converters 311 and 312 are each less than or equal to the first threshold, the first comparator 321 outputs, to the controller 140, a value, such as logic low or '0' set to connect the power converters 311 and 312 in series.

Although the embodiment is implemented such that the logic value output from the first comparator 321 is '1' to connect the power converters 311 and 312 in parallel, it should be understood that the logic value may also be set to '0' to connect the power converters 311 and 312 in parallel. In this case, the logic value '1', output from the first comparator 321, is used to connect the power converters 311 and 312 in series.

The first comparator 321 transfers the comparison result to the controller 140 via an indication port of the controller 140. The indication port receives the outputs of the first comparator 321.

The second comparator 322 receives the voltage levels of the power converters 311 and 312. While receiving the voltage levels of the power converters 311 and 312, the second comparator 322 also receives a second threshold set to enable the system to collect electric power via the series-parallel control circuit or to stop the system from collecting electric power via the series-parallel control circuit.

The second threshold is used for the system such that the power converters 311 and 312 are connected in parallel when the voltage levels of the power converters 311 and 312 are each greater than the second threshold, and the system for collecting electric power via the series-parallel control circuit is stopped when the voltage levels of the power converters 311 and 312 are each less than or equal to the second threshold. The second comparator 322 compares the voltage levels of the comparators 321 and 322 with the second threshold, and outputs the comparison result to the controller 140.

The second comparator 322 transfers the comparison result to the controller 140 via the ON/OFF port of the controller 140. The ON/OFF port of the controller 140 receives the outputs of the second comparator 322 or an ON/OFF command of the system for collecting electric power via the series-parallel control circuit. An example of the second threshold is 4.5 V.

When the voltage levels of the power converters 311 and 312 are each greater than the second threshold, the second comparator 322 outputs, to the controller 140, a value, such as logic low or '0' set to maintain a turn-on state of the system for collecting electric power via the series-parallel control circuit.

When the voltage levels of the power converters 311 and 312 are each less than or equal to the second threshold, the second comparator 322 outputs, to the controller 140, a value, such as logic high or '1' set to turn off the system for collecting electric power via the series-parallel control circuit.

Although the embodiment is implemented such that the logic value output from the second comparator 322 is '0' to turn on the system for collecting electric power via the series-parallel control circuit 101, it should be understood that the logic value may also be set to '1' to turn on the system for collecting electric power via the series-parallel control circuit 101. In this case, the logic value '0', output from the second comparator 322, is used to turn off the system for collecting electric power via the series-parallel control circuit 101.

The switches 331 and 332 switch between series and parallel connections of the first and second power converters 311 and 312 based on the comparison result output from the comparators 321 and 322. In order to connect the power converters 311 and 312 in parallel, the first switch 331 and the second switch 332 are turned on under the control of the controller 140. In order to connect the power converters 311 and 312 in series, the first switch 331 is turned off and the second switch 332 is turned on, under the control of the controller 140.

The controller 140 receives a result created as the first comparator 321 compares the voltage levels of the power converters 311 and 312 with the first threshold. When the voltage levels of the power converters 311 and 312 are greater than the first threshold, the controller 140 controls the switches 331 and 332 to connect the first and second power converters 311 and 312 in parallel. More specifically, the controller 140 controls the switches 331 and 332 to connect the power converters 311 and 312 in parallel when the controller 140 receives a value, such as logic low '0' set for parallel connection from the first comparator 321. For example, the controller 140 controls the switches 331 and 332 so that the first switch 331 is turned on to connect to 'a' and the second switch 332 is turned on to connect to 'c'. In this case, the first and second power converters 311 and 312 are connected to each other in parallel.

In another embodiment, when the voltage levels of the power converters 311 and 312 is less than or equal to the first threshold, the controller 140 controls the switches 331 and 332 to connect the first and second power converters 311 and 312 in series.

More specifically, when the controller 140 receives a value, such as logic high '1' set for series connection from the first comparator 321, the controller 140 controls the switches 331 and 332 to connect the power converters 311 and 312 in series. For example, the controller 140 controls the switches 331 and 332 so that the first switch 331 is turned off to connect to 'b' and the second switch 332 is turned on to connect to 'c'. In this case, the first and second power converters 311 and 312 are connected to each other in series.

Although the embodiment is implemented such that the value for parallel connection is set to logic low '0' and the value for series connection is set to logic high '1', it may also be modified such that the value for parallel connection is set to logic high '1' and the value for series connection is set to logic low '0'.

The controller 140 may also control the switches 331 and 332 using a control voltage. When the series-parallel control circuit of the electronic device is manually controlled according to a voltage level, the controller 140 turns on/off the comparators 321 and 322 uses a control voltage to manually control the power converters 311 and 312 to be connected in series or in parallel.

The embodiment shown in FIG. 3A describes the power converters 311 and 312 based on solar generator and TEG. However, it should be understood that the power converters 311 and 312 may also be replaced with a travel adaptor (TA) that is capable of connection to external power sources.

When one of the power converters 311 and 312 is a charger, the controller 140 connects the other power converter and the charger in series or in parallel.

When the embodiment is implemented to include three or more power converters, it may also include switches or comparators corresponding to the number of power converters.

Referring to FIG. 3B, the electronic device 100 further includes charging units 151 and 152 for charging power from external sources. The charging units 151 and 152 may be configured to supply external power to the electronic device 100 via charging terminals.

When two or more batteries 170 shown in FIG. 1 are discharged, the controller 140 controls the charging units 151 and 152 to receive external power.

In another embodiment, when two or more batteries 170 have been charged to a fully-charged state, the controller 140 controls the charging units 151 and 152 to stop receiving external power.

The electronic device further includes the power converters 311 and 312, and the charging units 151 and 152. It should be understood that the present disclosure is not limited by the number of the power converters and the charging units. The controller 140 controls the power converters 311 and 312 and the charging units 151 and 152 to be connected in series or in parallel, according to the voltage level of the power converters 311 and 312.

The controller 140 controls the power converters 311 and 312 and the charging units 151 and 152 so that one of the power converters 311 and 312 and one of the charging units 151 and 152 are connected to each other in series or in parallel.

The controller 140 controls the power converters 311 and 312 and the charging units 151 and 152 so that the power converters 311 and 312 and one of the charging units 151 and 152 are connected to each other in series or in parallel.

The controller 140 controls the power converters 311 and 312 and the charging units 151 and 152 so that one of the power converters 311 and 312 and the charging units 151 and 152 are connected to each other in series or in parallel.

It should be understood that there are many modifications in series or parallel connection between power converters and charging units as the number of power converters or charging units increases.

When the voltage level of the power converters 311 and 312 is greater than the first threshold, the controller 140 connects the power converters 311 and 312 and charging units 151 and 152 in parallel. It should be understood that there are many embodiments for parallel connection between the power converters 311 and 312 and charging units 151 and 152.

When the voltage level of the power converters 311 and 312 is less than or equal to the first threshold, the controller 140 connects the power converters 311 and 312 and charging units 151 and 152 in series. It should be understood that there are many embodiments for series connection between the power converters 311 and 312 and charging units 151 and 152.

Figure 4A:
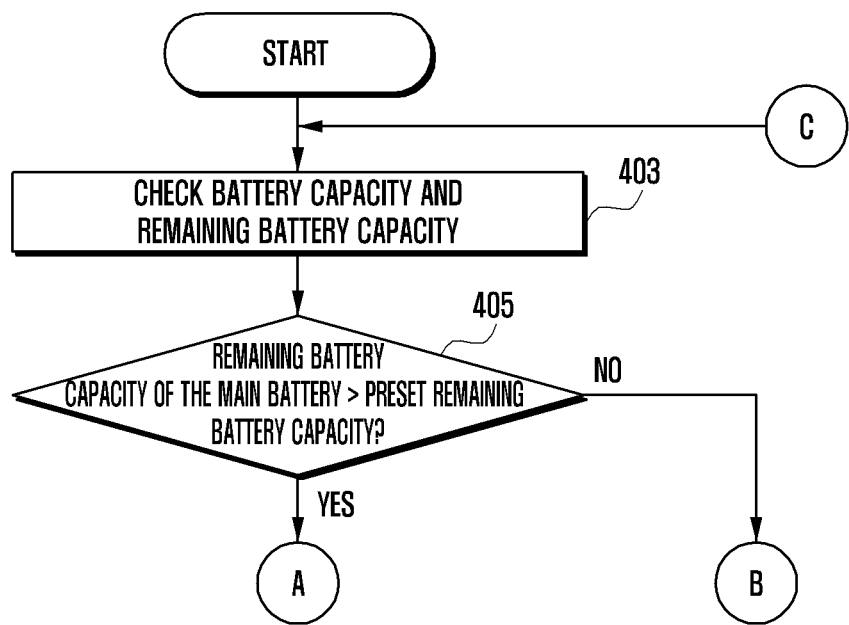
FIGS. 4A and 4B illustrate a method of charging several batteries of an electronic device, according to embodiments of the present disclosure.
Figure 4B:
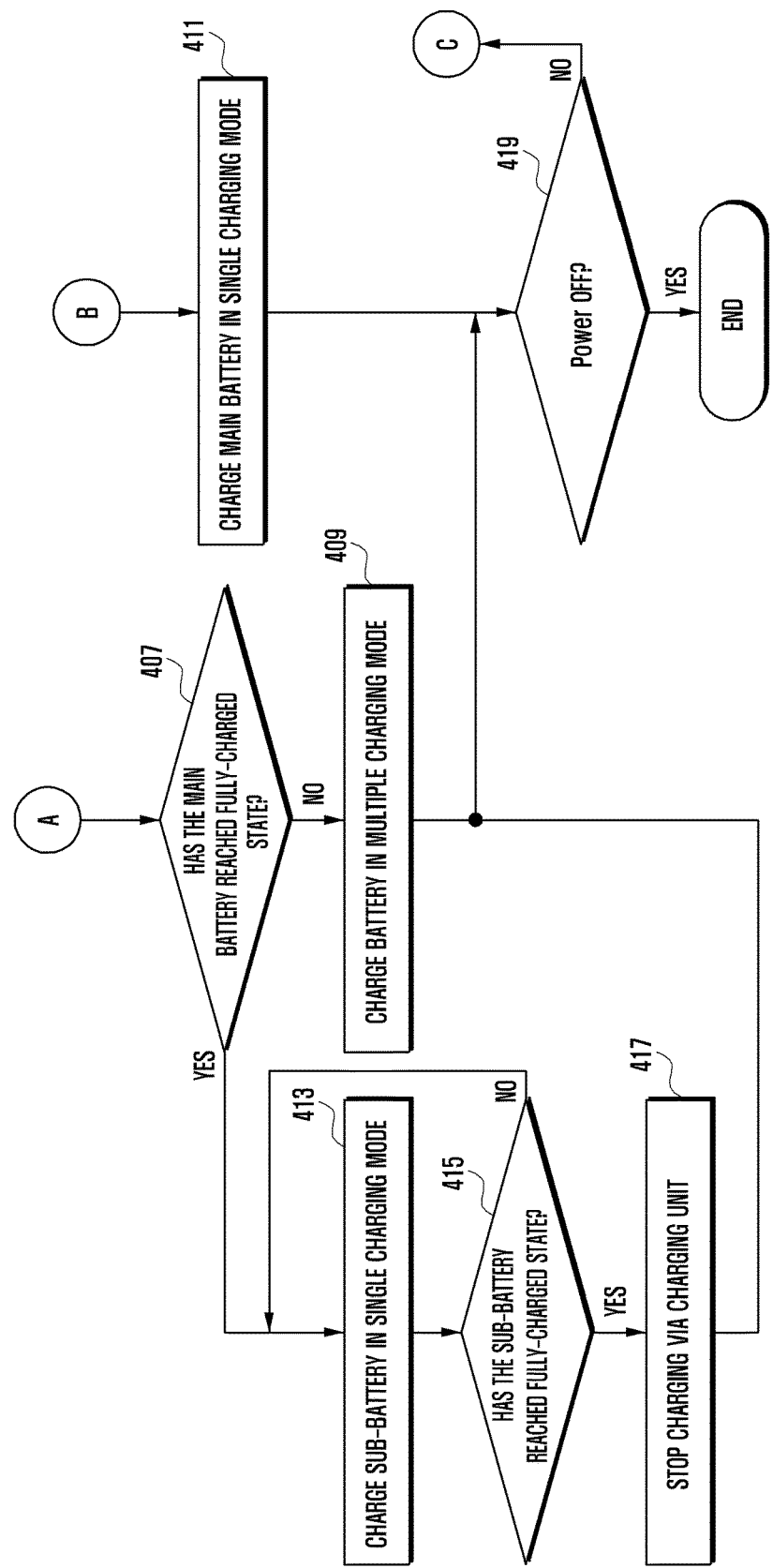

FIGS. 4A and 4B illustrate a method of charging several batteries of an electronic device according to embodiments of the present disclosure.

Referring to FIG. 4A, the controller 140 checks a capacity of the battery 170 and the remaining capacity of the battery 170 in step 403. The controller 140 also checks the number of batteries 170.

Based on the checked battery capacity, the controller 140 considers a battery of a relatively small capacity to be a main battery and a battery of a relatively large capacity to be a sub-battery.

The controller 140 determines whether the checked battery capacity is greater than or equal to a preset remaining battery capacity, which will be described later. The preset remaining battery capacity is a reference value set to select a charging mode of the battery.

According to an embodiment, the battery 170 detects that it is configured to include several batteries, such as a main battery and a sub-battery.

The main battery may have a smaller capacity than the sub-battery, considering efficiency. More specifically, when the remaining capacity of the main battery and the remaining capacity of the sub-battery are less than or equal to a preset remaining battery capacity respectively, the capacity of the main battery may be small so that it can be charged quickly. However, the embodiment may also be modified such that the main battery has a larger capacity than the sub-battery.

The controller 140 determines whether the remaining capacity of the main battery is greater than or equal to the preset remaining battery capacity in step 405. The preset remaining battery capacity is a preset level used to select a battery charging mode. When the remaining capacity of the main battery is less than or equal to a preset remaining battery capacity in step 405, the controller 140 controls the main battery to operate in a single charging mode in step 411. In the single charging mode, one of several batteries is first charged using electric power collected via the series-parallel control circuit. Giving priority of charging to one battery over the other batteries allows one battery to be more quickly charged than another battery, instead of all of the batteries being simultaneously charged.

The main battery may have a smaller capacity than the sub-battery. For example, the main battery may have a capacity of 20 mA, and the sub-battery may have a capacity of 2000 mA. Therefore, the controller 140 controls the battery of a relatively small capacity to operate in a single charging mode, and charges this battery first so that it is quickly charged.

When the remaining capacity of the main battery is greater than or equal to a preset remaining battery capacity in step 405, the controller 140 determines whether the main battery has been charged to a fully-charged state in step 407 of FIG. 4B.

When the main battery has not been charged to a fully-charged state in step 407, the controller 140 controls the battery 170 to operate in a multiple charging mode in step 409. The battery 170 may be configured to include two or more batteries. The multiple charging mode may be set such that electric power collected by the series-parallel control circuit is simultaneously provided to several batteries. In a multiple charging mode, the controller 140 supplies electric power to the main battery and the sub-battery simultaneously, and controls the batteries so that they cannot be separately charged and discharged. The controller 140 may further include a mutual charging prevention controller to prevent batteries from mutually charging and discharging. The mutual charging prevention controller receives current from the series-parallel control circuit under the control of the controller 140, and is designed to prevent reverse current.

When the main battery has been charged to a fully-charged state in step 407, the controller 140 controls the sub-battery to be charged in a single charging mode in step 413.

The controller 140 then determines whether the sub-battery is charged to a fully-charged state in step 415, that is, determines whether both the main battery and the sub-battery have been charged to a fully-charged state.

When the controller 140 ascertains that both the main battery and the sub-battery have been charged to a fully-charged state, the controller 140 stops charging via the charging units in step 417.

The controller 140 repeats the processes described above until the power is off in step 419. When the power is off, the controller 140 controls several batteries to be discharged sequentially. The controller 140 may further include a sequential discharging controller, which the controller 140 controls to switch several batteries so that they cannot be simultaneously discharged.

When several batteries 170 are all discharged, the controller 140 receives electric power from a charging unit such as a charger.

Figure 5:
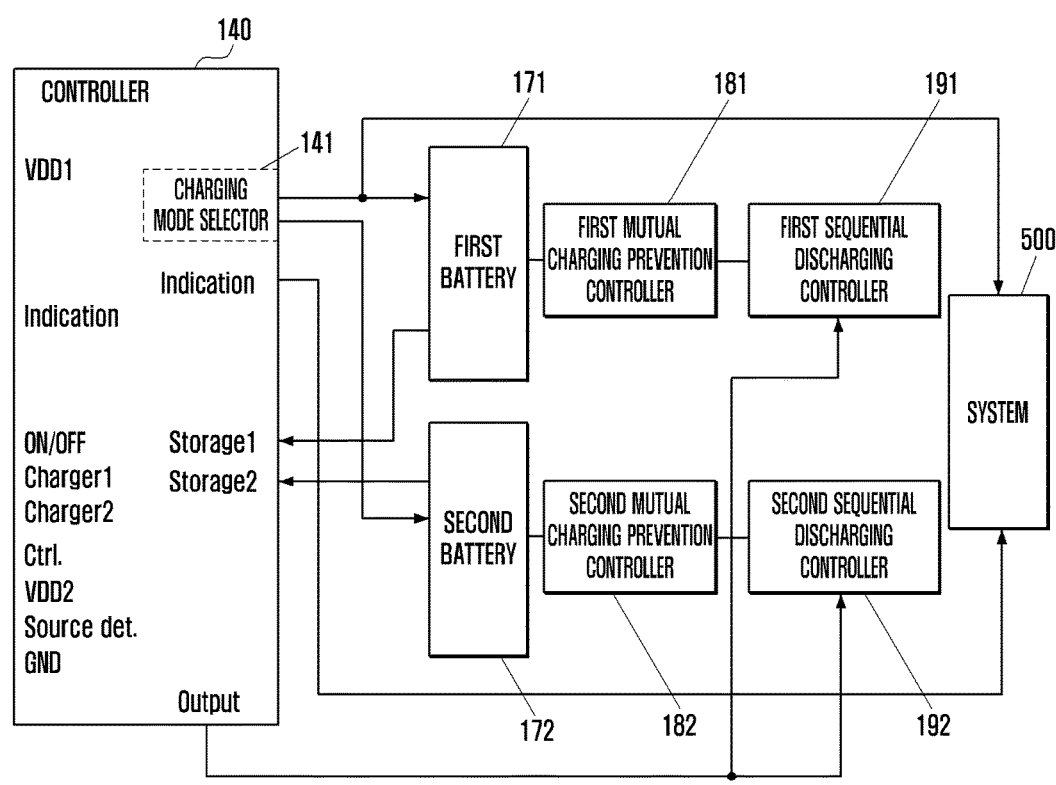
FIG. 5 illustrates a circuit for charging a battery of an electronic device, according to embodiments of the present disclosure.

FIG. 5 illustrates a circuit for charging electric power collected via a series-parallel control circuit of an electronic device according to embodiments of the present disclosure.

Referring to FIG. 5, the charging circuit uses electric power provided by a series-parallel control circuit. The charging circuit includes two batteries 171 and 172, two mutual charging prevention controllers 181 and 182, two sequential discharging controllers 191 and 192, a controller 140, and a system 500.

The charging circuit may be a coupled form, as several electronic devices are connected, or may be included in one electronic device. In addition, one electronic device may also include at least two configurations of the charging circuit.

The main battery may have a relatively small battery capacity and the sub-battery may have a relatively large battery capacity, or vice-versa. The main battery and the sub-battery may also have the same capacity.

For the sake of convenience, it will be assumed that the main battery i.e., a first battery 171, has a relatively small battery capacity, and the sub-battery, i.e., a second battery 172, has a relatively large battery capacity.

The controller 140 sets a charging mode to supply electric power to the batteries 171 and 172, according to the voltage of the batteries 171 and 172. The controller 140 controls the charging mode selector 141 to select one of the single charging mode and multiple charging mode.

The single charging mode supplies electric power to one of the batteries 171 and 172. More specifically, when the voltage level of the battery 171 or 172 is less than or equal to a reference voltage level, the controller 140 supplies electric power to the battery 171 or 172 in a single charging mode.

When the voltage levels of the batteries 171 and 172 are both less than or equal to a preset remaining battery capacity, the controller 140 first charges the first battery 171 (main battery) in priority over the second battery 172 in a single charging mode.

In another embodiment, when the voltage levels of the batteries 171 and 172 are both less than or equal to a preset, remaining battery capacity, the controller 140 first charges a battery of a relatively smaller capacity than the other battery in a single charging mode.

The controller 140 performs a control operation so that the main battery of a relatively small capacity, or the first battery 171, can be quickly charged prior to charging of the second battery 172. For example, when it is assumed that the first battery 171 has a capacity of 20 mA and the second battery 172 has a capacity of 2000 mA, the controller 140 performs a control operation so that the first battery 171 can be first charged in a single charging mode. The first battery 171 can be more quickly charged in a single charging mode than in a multiple charging mode.

When the remaining capacity of a first battery 171 (main battery) is greater than or equal to a preset remaining battery capacity and the main battery has not been charged to a fully-charged state, the controller 140 performs a control operation so that the first battery 171 (main battery) and the second battery 172 (sub-battery) are simultaneously charged in a multiple charging mode, in which case the controller 140 controls mutual charging prevention controllers 181 and 182 to prevent the first and second batteries 171 and 172 from mutually charging and discharging.

The mutual charging prevention controllers 181 and 182 prevent reverse current from flowing in the charging circuit, so that the first battery 171 and second battery 172 cannot be separately charged and discharged. More specifically, the first battery 171 and second battery 172 are set to be charged via the series-parallel control circuit 101 under the control of the controller 140. Therefore, the first battery 171 is set not to charge the second battery 172 and the second battery 172 is set not to charge the first battery 171.

The controller 140 determines whether the voltage levels of the first battery 171 and the second battery 172 are both less than or equal to a reference voltage level and the first battery 171 and the second battery 172 are discharged. When the first battery 171 and the second battery 172 are discharged, the controller 140 controls the sequential discharging of controllers 191 and 192 to discharge the batteries 171 and 172 sequentially. The sequential discharging controllers 191 and 192 include a switching circuit which performs a switching control process so that the first and second batteries 171 and 172 are discharged sequentially.

The controller 140 controls the charging circuit to charge the batteries 171 and 172 or to supply electric power to the system 500, as described. The controller 140 supplies electric power to the system 500, thereby powering the electronic device.

Figure 6:
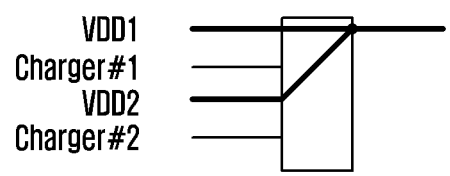
FIG. 6 illustrates part of a circuit for charging a battery of an electronic device, according to embodiments of the present disclosure.
Figure 6:
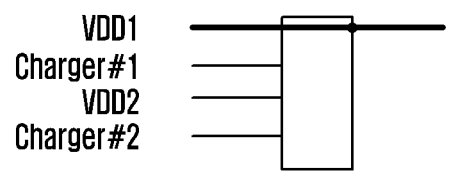
Figure 6:
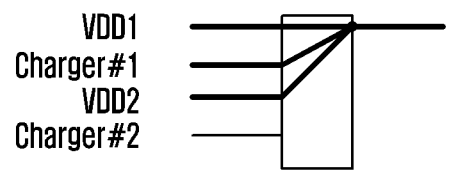
Figure 6:
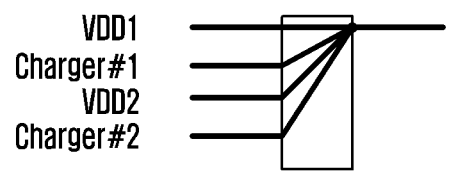

FIG. 6 illustrates part of a circuit for controlling the supply of electric power in an electronic device according to embodiments of the present disclosure.

Referring to FIG. 6, the controller 140 quickly charges one of the batteries 171 and 172 via the power converters 311 and 312 and the charging units 151 and 152, shown in FIG. 3, in order to support a single charging mode.

The first power converter 311 may be VDD 1, and the second power converter 312 may be VDD 2. The first charging unit 351 may be Charger 1 and the second charging unit 352 may be Charger 2.

The series-parallel control circuit of an electronic device may be configured with only power converters 311 and 312 in order to support a single charging mode as shown in FIG. 3A. In this case, the controller 140 controls series connection and parallel connection between the power converters 311 and 312 according to the voltage level of the first and second power converters 311 and 312.

When the voltage level of the first and second power converters 311 and 312 is greater than a reference voltage level, the controller 140 connects the first and second power converters 311 and 312 in parallel. Since the first power converter 311 is VDD 1 and the second power converter 312 is VDD 2, the controller 140 connects VDD 1 and VDD 2 in parallel to collect electric power and supplies the collected power to one of the batteries 171 and 172 as shown in diagram 610.

When the voltage level of the first and second power converters 311 and 312 is less than or equal to a reference voltage level, the controller 140 connects the first and second power converters 311 and 312 in series. Since the first power converter 311 is VDD 1 and the second power converter 312 is VDD 2, the controller 140 collects electric power via VDD 1 and supplies the collected power to one of the batteries 171 and 172 as shown in diagram 620. The controller 140 may also collect electric power via VDD 2 and supply the collected power to one of the batteries 171 and 172.

The charging circuit of an electronic device may be configured with power converters 311 and 312 and charging units 351 and 352 in order to support a single charging mode as shown in FIG. 3B. Considering the first power converter 311 as VDD 1, and the second power converter 312 as VDD 2, and considering the first charging unit 351 as Charger 1 and the second charging unit 352 as Charger 2, the controller 140 collects electric power via VDD 1, VDD2 and Charger 1 and supplies the collected power to one of the batteries 171 and 172 as shown in diagram 630. In addition, the controller 140 collects electric power via VDD 1, VDD2, Charger 1 and Charger 2 and supplies the collected power to one of the batteries 171 and 172 as shown in diagram 640.

Figure 7:
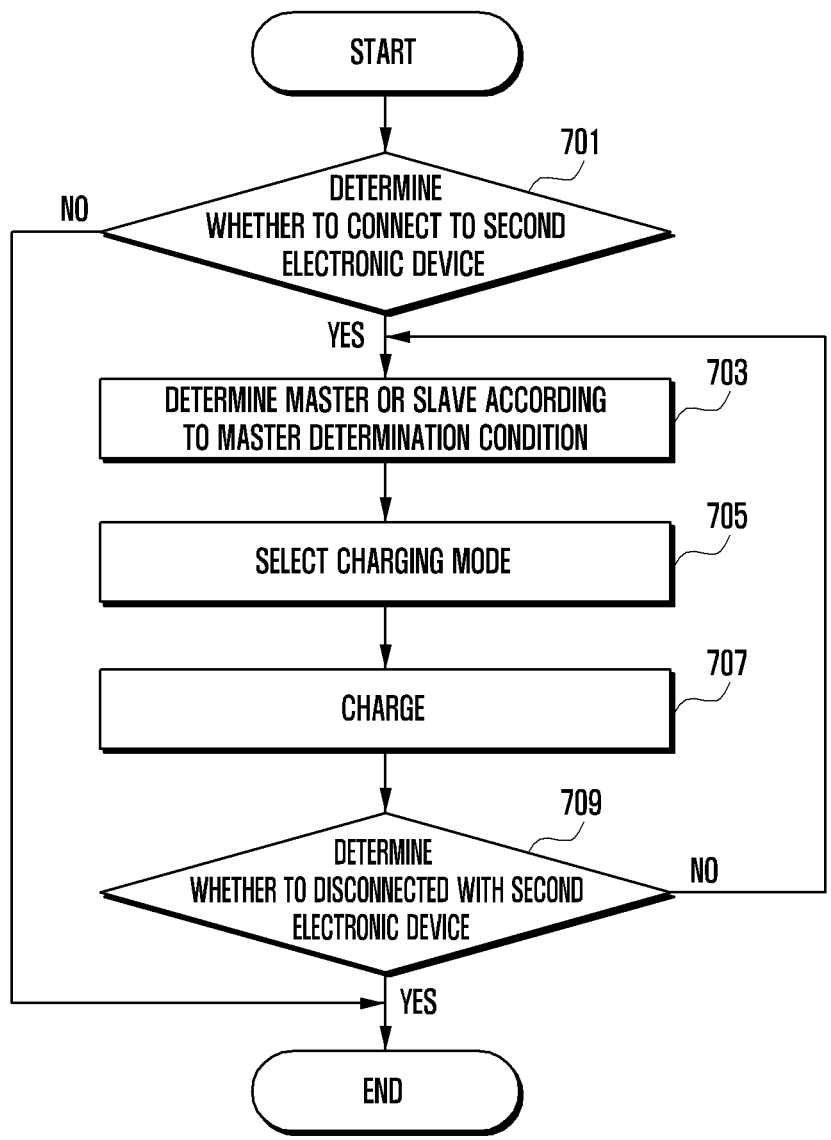
FIG. 7 illustrates a method of charging a battery when several electronic devices are connected, according to embodiments of the present disclosure.

FIG. 7 illustrates a method of controlling the supply of power when several electronic devices are connected, according to embodiments of the present disclosure.

Referring to FIG. 7, the controller 140 determines whether the electronic device is being connected to a second electronic device in step 701, such as in a docking operation. The controller 140 connects to an external electronic device when the controller 140 detects connection to the external electronic device. Although the embodiment describes connection between electronic devices based on a docking operation, it should be understood that the present disclosure is not limited to the embodiment. For example, connection may also include wireless communication, such as Bluetooth™ or near field communication (NFC) or wired communication, such as universal serial bus (USB) port connection.

In an embodiment, one electronic device 100 includes one or more charging units and one or more batteries. Therefore, when one electronic device is connected with several electronic devices, the electronic device may be configured such that it includes several charging units and several batteries.

When one electronic device 100 is connected with two or more electronic devices, the electronic device 100 determines whether it is a master or slave according to a master determination condition in step 703. The master determination condition concerns whether the electronic device has a charging circuit or a remaining battery capacity, or whether the electronic device is connected to a charging unit, for example When the electronic device 100 includes a charging circuit, has a remaining battery capacity that is greater than or equal to a reference voltage level, and includes a charging unit, the electronic device 100 is determined to be a master.

The controller 140 selects a charging mode based on the remaining battery capacity of the two or more electronic devices connected to the electronic device 100 in step 705. The charging mode may be a single charging mode or a multiple charging mode as described above.

The controller 140 charges the battery in the selected charging mode in step 707. The controller 140 determines whether the electronic device is disconnected with the external electronic device in step 709. When the electronic device is connected with the external electronic device in step 709, the controller 140 returns to step 703 and repeats the processes described above, until the electronic device is connected with the external electronic device.

Figure 8:
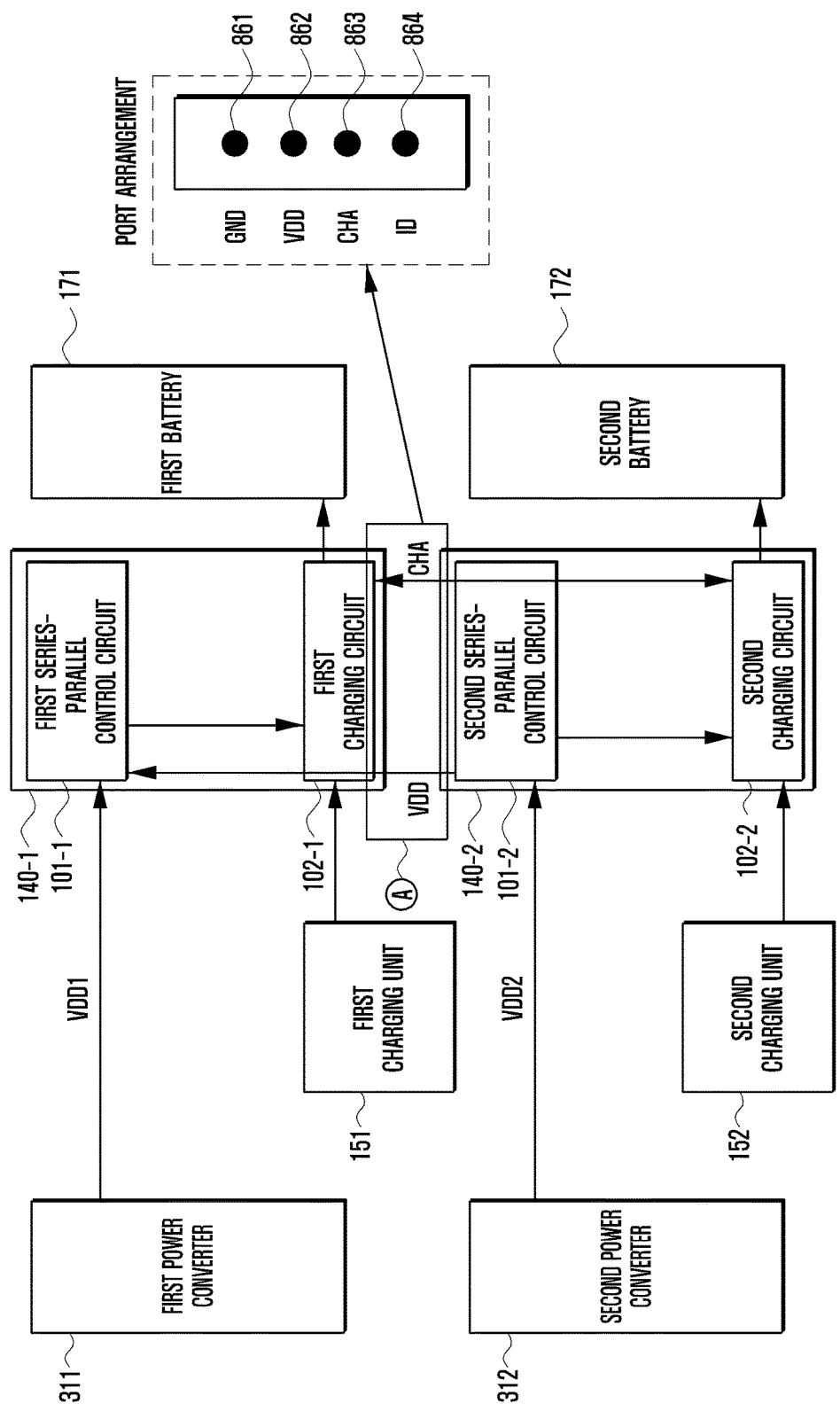
FIG. 8 illustrates a method of charging a battery when several electronic devices are connected, according to embodiments of the present disclosure.

FIG. 8 illustrates a method of controlling the supply of power when several electronic devices are connected, according to embodiments of the present disclosure. Referring to FIG. 8, the electronic device 100 charges the battery through connection with several electronic devices.

In an embodiment, one electronic device may be configured to include one or more charging units and one or more batteries. Therefore, when one electronic device is connected with several electronic devices, the electronic device is configured to include several charging units and several batteries.

In the following description, it is assumed that one electronic device includes one charging unit and one battery. However, it should be understood that the present disclosure is not limited to the embodiment. That is, one electronic device may be configured to include one or more charging units and one or more batteries.

One electronic device includes a first power converter 311, a first series-parallel control circuit 140-1, a first charging unit 151 and a battery 171.

Another electronic device to which the electronic device is connected with its connector includes a second power converter 312, a second series-parallel control circuit 140-2, a second charging unit 152 and a battery 172.

At least two electronic devices may be connected to each other with a connector A. When the two or more electronic devices are connected to each other, one electronic device may be a master and the other may be a slave. A master determination condition may be used to determine whether an electronic device is a master or slave. The master determination condition is described above. When an electronic device includes a charging circuit, has a remaining battery capacity that is greater than or equal to a reference voltage level, and includes a charging unit, the electronic device is determined to be a master.

When two or more electronic devices are connected to each other, each electronic device may be configured such that it includes two or more power converters and two or more batteries.

The connector A may be a port connectable to an external electronic device. One electronic device and another electronic device may be connected to each other via ports. The connector A includes ground (GND) terminal 861, VDD terminal 862, CHA terminal 863, and ID terminal 864. According to the number of external pins, VDD terminal 862 and CHA terminal 863 may be integrated into a single terminal. To this end, VDD terminal 862 and CHA terminal 863 are electrically connected to each other in bridge or selected by a switch.

GND terminal 861 is a ground terminal used to fix a reference voltage, VDD terminal 862 is a voltage source terminal used to receive electric power, CHA terminal 863 is a power charging terminal used to charge a battery, and ID terminal 864 checks a connection status between electronic devices and is used to control charging between electronic devices. The ID terminal 864 is used to determine whether the electronic device is a master or slave, and sets one electronic device 100 as a master and another as a slave. The ID terminal 864 may also be used to select a charging mode, such as a single charging mode or a multiple charging mode.

When two or more electronic devices are connected to each other, embodiments may be implemented as follows.

A first controller 140-1 controls the connection of first and second power converters 311 and 312 in series or in parallel via a first series-parallel control circuit 101-1. The first series-parallel control circuit 101-1 receives electric power from the first power converter 311 and the second series-parallel control circuit 101-2. The electric power from the second series-parallel control circuit 101-2 is received by the second series-parallel control circuit 101-2 from the second power converter 312.

As the first controller 140-1 receives electric power, it controls the connection of the power converters 311 and 312 in series or in parallel according to the voltage level of the first and second power converters 311 and 312. That is, when the voltage level of the first and second power converters 311 and 312 is greater than a reference voltage level, the first controller 140-1 connects the first and second power converters 311 and 312 in parallel. The reference voltage level is a reference value used to connect the first and second power converters 311 and 312 in series or in parallel. When the voltage level of the first and second power converters 311 and 312 is less than or equal to a reference voltage level, the first controller 140-1 connects the first and second power converters 311 and 312 in series.

The first controller 140-1 controls the first series-parallel control circuit 101-1 to convert energy into electric power and to supply the electric power to the first charging unit 102-1. The first controller 140-1 charges the first battery 171 or second battery 172, in a single charging mode, using the supplied power. The first controller 140-1 is also capable of simultaneously charging the first battery 171 and second battery 172, in a multiple charging mode, using the supplied power. The first controller 140-1 charges the second battery 172 in a multiple charging mode using the second charging circuit 102-2.

The second controller 140-2 is also capable of performing control process in the same manner as described above.

The first controller 140-1 controls the first series-parallel control circuit 101-1 to connect the first and second power converters 311 and 312 in series or in parallel. The first series-parallel control circuit 101-1 receives electric power via the first power converter 311 and the second series-parallel control circuit 101-2. The second series-parallel control circuit 101-2 supplies the received electric power to the first charging circuit 102-1, and the first charging unit 151 simultaneously supplies electric power to the first charging circuit 102-1.

When a power converter and a charging unit are set as component to receive electric power, the controller 140-1 controls the components to receive electric power from the first charging unit 151. Since the first charging circuit charges the first and second batteries 171 and 172 in the same manner as the controller 140 charges the first and second batteries 171 and 172 as shown in FIG. 5, a detailed description is omitted.

In an embodiment, since the second controller 140-2 charges the batteries via the second charging unit 152 in the same manner as the controller 140 charges the batteries via the charging unit 151 or 152 as shown in FIG. 5, a detailed description is omitted.

Figure 9:
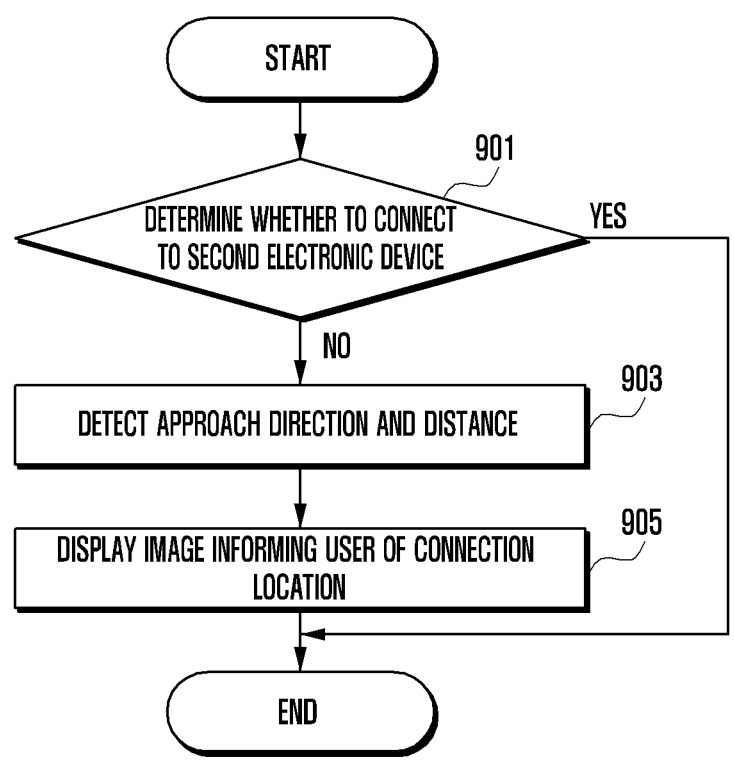
FIG. 9 illustrates a method of notifying that several electronic devices are connected, according to embodiments of the present disclosure.

FIG. 9 illustrates a method of notifying the connection of several electronic devices, according to embodiments of the present disclosure. FIGS. 10A to 10E illustrate screens that notify the connection of several electronic devices, according to embodiments of the present disclosure.

Referring to FIG. 9, the electronic device 100 determines whether it is being connected to a second electronic device in step 901, such as by a docking operation. The electronic device 100 includes a recognition module, such as a smart Hall IC. The electronic device 100 determines the direction and the proximity strength of the second electronic device via the recognition module.

The electronic device 100 determines the direction that the second electronic device approaches and the distance from the second electronic device in step 903. The electronic device 100 determines whether the second electronic device is approaching to connect to the electronic device 100 within a preset distance from the connector or that the second electronic device has connected to the connector of the electronic device 100.

The electronic device 100 displays an image informing the user of the connection location, according to the distance from the second electronic device, in step 905. The electronic device 100 displays an image informing the user of the connection location via the display 130 of the electronic device 100.

When the electronic device 100 has not been connected with the second electronic device, the electronic device 100 displays, on the display, an image informing the user of the connection location, based on the distance from the second electronic device and the direction towards the second electronic device.

Figure 10A:
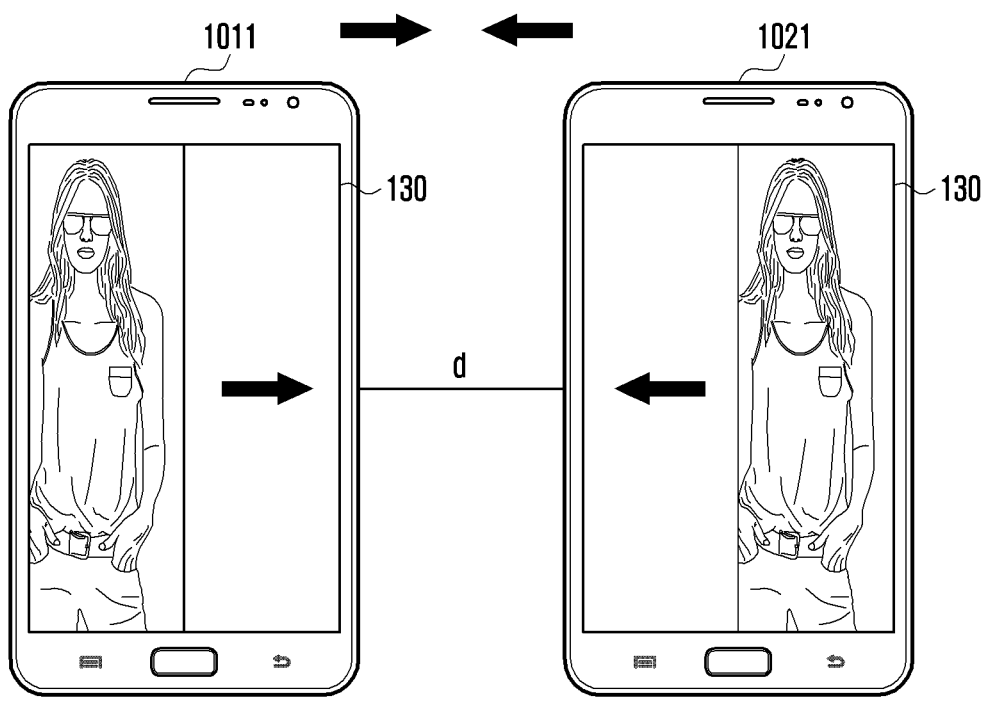
FIGS. 10A, 10B, 10C, 10D and 10E illustrate screens notifying that several electronic devices are connected, according to embodiments of the present disclosure.

As shown in FIG. 10A, an electronic device determines approach of a second electronic device, within a preset range d, in the parallel position. Referring to FIG. 10A, an electronic device 1011 at the left determines whether another electronic device 1021 has approached from the right. In this case, the electronic device 1011 displays a preset image at the left on the screen.

Figure 10B:
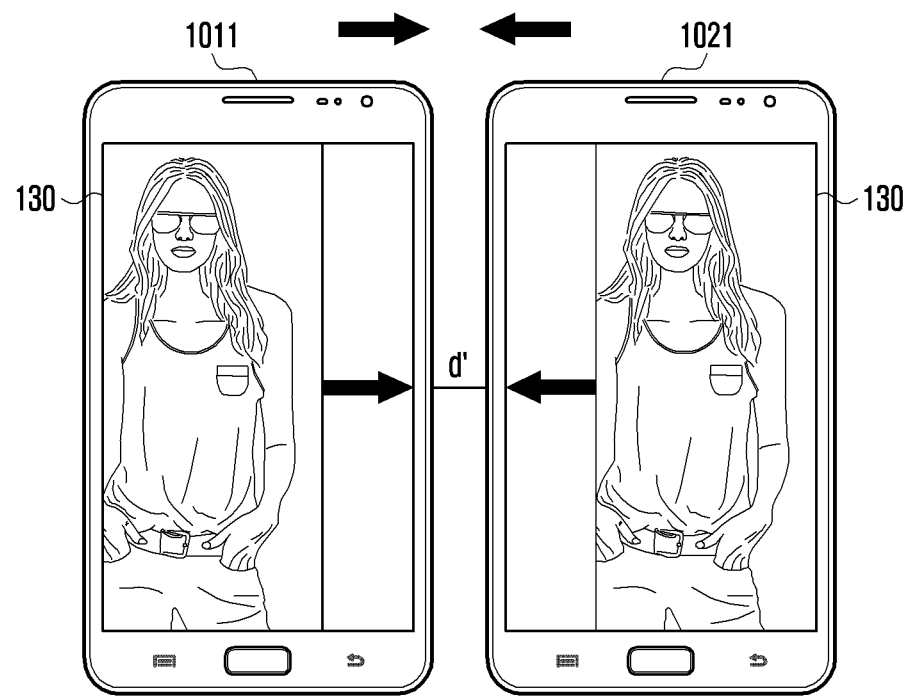

In contrast, the electronic device 1021 at the right determines whether another electronic device 1011 has approached from the left. In this case, the electronic device 1021 displays a preset image at the right on the screen. When the two electronic devices are approaching closer to each other, i.e., distance d' shown in FIG. 10B compared to distance d shown in FIG. 10A, the electronic devices display each the image on the display 130, by adjusting it in size, such as moving or extending it, towards the correspondent electronic device, as shown in FIG. 10B.

Figure 10C:
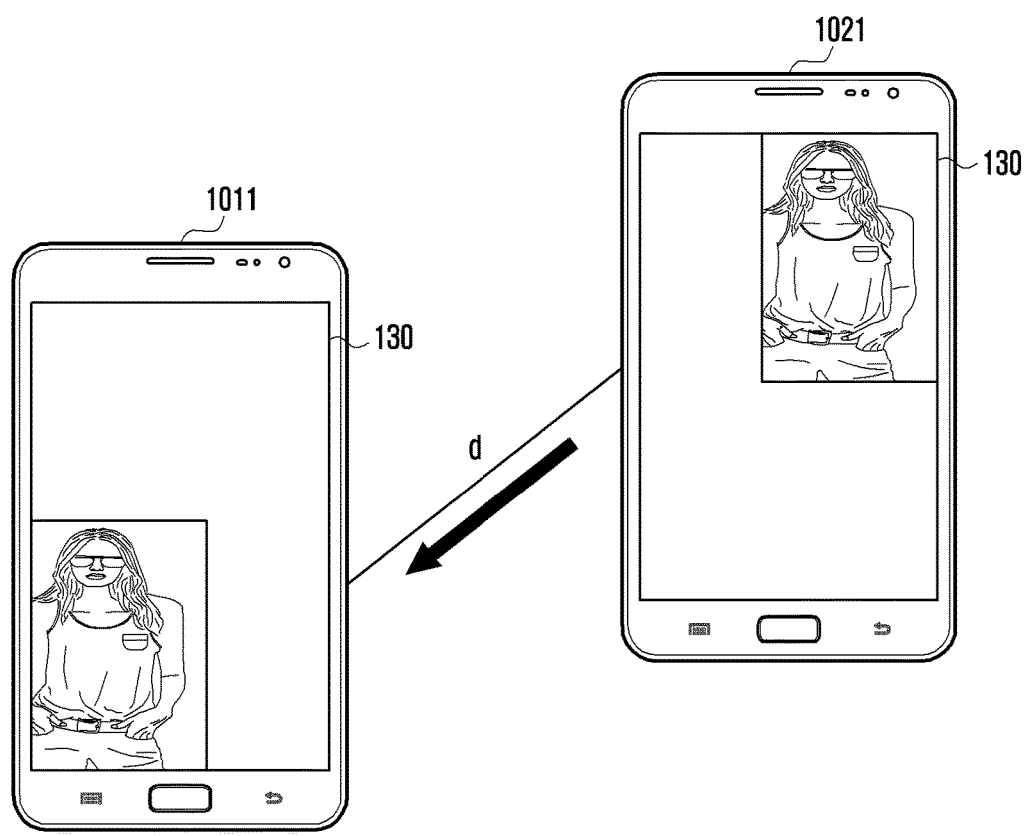

As shown in FIG. 10C, an electronic device detects approach of a second electronic device, within a preset range d. Referring to FIG. 10C, an electronic device 1011 at the left determines whether another electronic device 1021 has approached from the top right. In this case, the electronic device 1011 at the left displays a preset image at the bottom left on the screen.

Figure 10D:
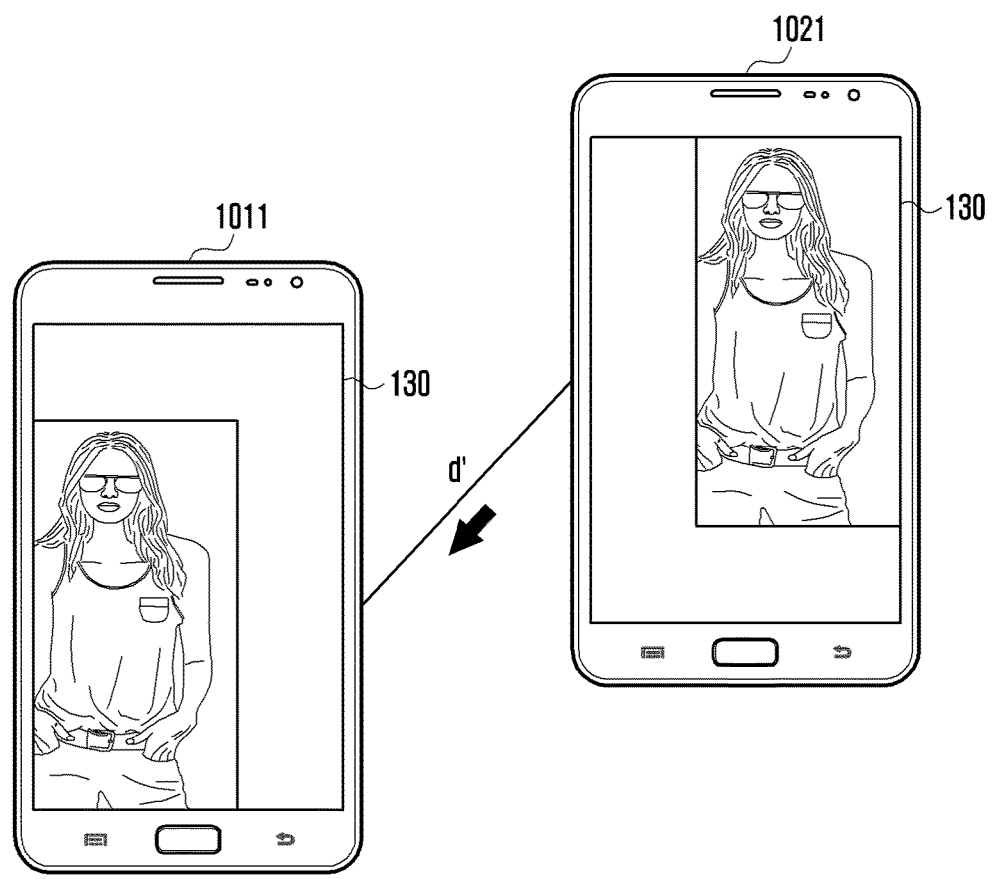

In contrast, the electronic device 1021 at the right determines whether another electronic device 1011 has approached from the bottom left. In this case, the electronic device 1021 at the right displays a preset image at the top right on the screen. When the two electronic devices are approaching closer to each other, i.e., distance d' shown in FIG. 10D compared to distance d shown in FIG. 10C, the electronic devices display each the image on the display 130, by adjusting it in size, such as moving or extending it, towards the correspondent electronic device, as shown in FIG. 10D.

In another embodiment, one electronic device may be in physical contact with another electronic device. In this case, the electronic devices display an image on the displays 130, respectively, informing the users that the electronic devices are connected to each other via connection locations, as shown in FIG. 10E.

Figure 10E:
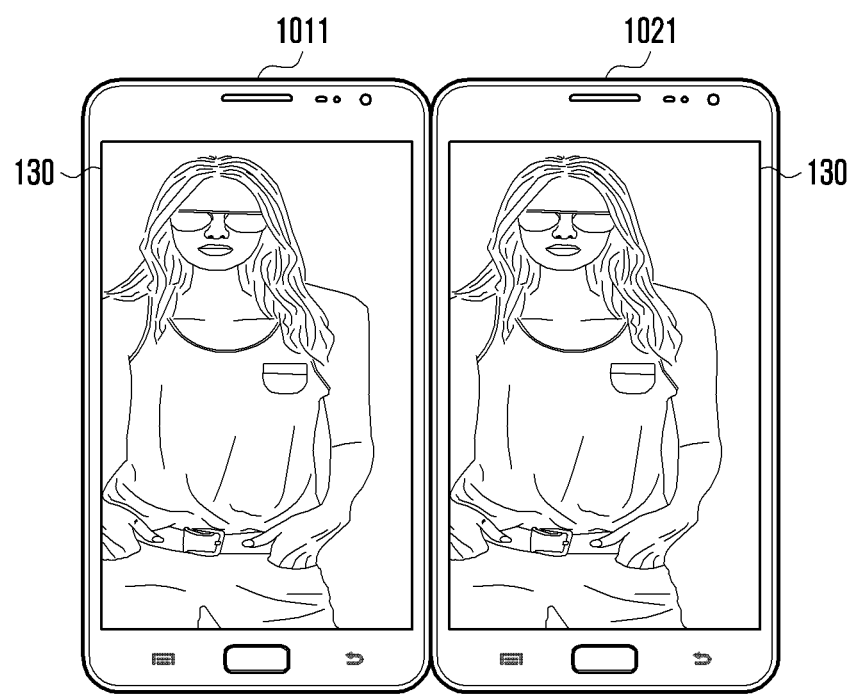

As shown in FIG. 10E, one electronic device 1011 displays a preset image on the display 130, informing the user that the electronic device has been connected to another electronic device 1021.

The electronic device according to embodiments of the present disclosure controls the connection of several power converters in series or in parallel, thereby effectively using power without wasting power consumption.

The electronic device also prevents several batteries from mutually charging and discharging, and prevents several batteries from simultaneously discharging.

The embodiments of the present disclosure described in the description and drawings are merely provided to assist in a comprehensive understanding of the disclosure and are not limited thereto.

Although embodiments of the disclosure have been described in detail above, it should be understood that many variations and modifications of the basic inventive concept herein described, which may be apparent to those skilled in the art, will still fall within the spirit and scope of the embodiments of the disclosure as defined in the appended claims and their equivalents.

What is claimed is:

1. An apparatus for controlling a supply of power in an electronic device comprising:
   two or more batteries including a main battery;
   a mutual charging prevention controller electrically connected to the two or more batteries and configured to prevent reverse current when the two or more batteries are simultaneously charged and control charging of the two or more batteries via a component other than the two or more batteries;
   a sequential discharging controller electrically connected to the mutual charging prevention controller and configured to prevent the two or more batteries from simultaneously discharging when the two or more batteries are discharged; and
   a controller electrically connected to the two or more batteries and configured to:
   detect remaining capacities of each of the two or more batteries, charge a main battery of the two or more batteries in a single charging mode, in response to determining that the remaining battery capacity of the main battery is less than or equal to a preset remaining battery capacity set to select a charging mode, and simultaneously charge the two or more batteries, in response to determining that the remaining battery capacity of the main battery is greater than the preset remaining battery capacity.

2. The apparatus of claim 1, further comprising:

two or more power converters that convert energy into electric power and charge at least one of the two or more batteries;

a comparator that compares a current voltage level of the two or more power converters with a preset reference voltage level and controls connection of the power converters; and a switch that switches between series and parallel connections by the two or more power converters, according to a comparison result of the comparator, wherein the controller further controls the switch to connect the two or more power converters in parallel when the current voltage level of the power converters is greater than the reference voltage level, and in series when the current voltage level of the power converters is less than or equal to the reference voltage level.

3. The apparatus of claim 2, further comprising:

one or more charging units that receive external power, wherein the controller further controls the switch to connect one or more power converters and the charging unit in parallel when the current voltage level of the power converters is greater than the reference voltage level, and in series when the current voltage level of the power converters is less than or equal to the reference voltage level.

4. The apparatus of claim 3, wherein the controller further charges a sub-battery of the two or more batteries in a single charging mode when the remaining capacity of the main battery is full.

5. The apparatus of claim 4, wherein the controller further checks capacities of the two or more batteries, recognizes a battery of a relatively small capacity from among the two or more batteries as the main battery, and quickly charges the main battery when the remaining capacity of the main battery is less than or equal to the preset remaining battery capacity.

6. The apparatus of claim 5, wherein the controller stops charging via the charging unit when the remaining capacities of the two or more batteries are full.

7. The apparatus of claim 2, wherein the comparator comprises:

two or more comparators, wherein one of the two or more comparators compares the current voltage level with a first threshold as a maximum reference voltage used to connect the two or more power converters in series or in parallel, and transfers a result of the current voltage level to the first threshold comparison to the controller; and wherein the other comparator compares the current voltage level with a second threshold as a minimum reference voltage used to determine whether to operate a system for collecting electric power via the two or more power converters, and transfers a result of the current voltage level to the second threshold comparison to the controller.

8. The apparatus of claim 2, further comprising:

a connector that connects to another electronic device, wherein the another electronic device comprises identical components as the electronic device, and wherein, when the electronic device is connected to the other electronic device, the electronic device charges the one or more batteries via a power converter, a comparator or a switch of the another electronic device.

9. The apparatus of claim 2, further comprising:

a display; and a recognition module that determines whether the electronic device is being connected to another electronic device, wherein the controller further detects that the electronic device is being connected to the another electronic device via the recognition module, and controls the display to display an image informing a user of a connection location.

10. The apparatus of claim 2, wherein the controller includes a charging mode selector that selects a mode in which the two or more batteries are charged, and wherein the controller controls the charging mode selector to select a single charging mode in which one of the two or more batteries is quickly charged, via the power converters, the comparator, the switch and the charging unit, or a multiple charging mode in which the two or more batteries are simultaneously charged.

11. A method of controlling the supply of power in an electronic device comprising:

checking remaining capacities of each of two or more batteries including a main battery;

comparing the checked remaining capacities of the two or more batteries with a preset remaining battery capacity to select a charging mode;

charging the main battery of the two or more batteries in a single charging mode, in response to determining that the remaining capacity of the main battery is less than or equal to the preset remaining battery capacity;

simultaneously charging the two or more batteries via a component other than the two or more batteries, in response to determining that the remaining capacity of the main battery is greater than the preset remaining battery capacity;

preventing reverse current while the two or more batteries are being charged simultaneously; and discharging the remaining capacities of the two or more batteries sequentially, by a sequential discharging controller that prevents the two or more batteries from simultaneously discharging.

12. The method of claim 11, further comprising:

converting energy into electric power by a power converter, in order to charge at least one of the two or more batteries;

comparing a current voltage level corresponding to the converted electric power with a preset reference voltage level to control connection of the two or more power converters; and connecting the two or more power converters in parallel when the current voltage level of the power converters is greater than the reference voltage level, and in series when the current voltage level of the power converters is less than or equal to the reference voltage level.

13. The method of claim 12, further comprising:

supplying electric power to the electronic device by one or more charging units, wherein connecting the two or more power converters in series comprises connecting one or more power converters and one or more charging units in parallel when the current voltage level is greater than the reference voltage level, and in series when the current voltage level is less than or equal to the reference voltage level.

14. The method of claim 13, wherein charging the batteries comprises:
charging a sub-battery of the two or more batteries in a single charging mode when the remaining capacity of the main battery is full.

15. The method of claim 13, wherein checking the remaining capacities of the two or more batteries comprises:
checking capacities of the two or more batteries; and
recognizing a battery of a relatively small capacity from among the two or more batteries as the main battery, and
wherein charging the batteries comprises charging the main battery quickly, in a single charging mode, when the remaining capacity of the main battery is less than or equal to the preset remaining battery capacity.

16. The method of claim 15, further comprising:
stopping charging via the charging unit when the remaining capacities of two or more batteries are full.

17. The method of claim 16, wherein comparing a current voltage level with a preset reference voltage level comprises:
comparing the current voltage level with a first threshold as a maximum of the reference voltage; and
comparing the current voltage level with a second threshold as a minimum of the reference voltage,
wherein comparing the current voltage level with a first threshold comprises:
switching to connect the two or more power converters in parallel when the current voltage level is greater than the first threshold, and in series when the current voltage level is less than or equal to the first threshold; and
wherein comparing the current voltage level with a second threshold comprises:
switching to connect the two or more power converters in parallel when the current voltage level is greater than the second threshold, and switching to stop collecting electric power by the two or more power converters when the current voltage level is less than or equal to the second threshold.

18. The method of claim 12, further comprising:
determining whether the electronic device is being connected to another electronic device;
displaying, when detecting that the electronic device is being connected to the another electronic device, an image that informs a user of a connection location; and
connecting the electronic device to the another electronic device via a connector displayed by the image.

* * * * *